US009077141B2

(12) United States Patent  (10) Patent No.: US 9,077,141 B2
Armbruster et al.  (45) Date of Patent: Jul. 7, 2015

(54) GAS LASER DEVICE AND GAS RESERVOIR

(75) Inventors: Kevin L. Armbruster, Chicopee, MA (US); Brad D. Gilmartin, Gardner, MA (US); Peter J. Kueckendahl, Bad Oldesloe (DE); Bernard J. Richard, Dudley, MA (US); Daniel J. Ryan, Sycamore, IL (US)

(73) Assignee: ALLTEC ANGEWANDTE LASERLICHT TECHNOLOGIE GMBH, Selmsdorf (DE)

( * ) Notice: Subject to any disclaimer, the term of this patent is extended or adjusted under 35 U.S.C. 154(b) by 0 days.

(21) Appl. No.: 14/342,508

(22) PCT Filed: Jul. 19, 2012

(86) PCT No.: PCT/EP2012/003072
§ 371 (c)(1),
(2), (4) Date: Mar. 3, 2014

(87) PCT Pub. No.: WO2013/034217
PCT Pub. Date: Mar. 14, 2013

(65) Prior Publication Data
US 2014/0226693 A1  Aug. 14, 2014

(30) Foreign Application Priority Data

Sep. 5, 2011  (EP) .................................... 11007188

(51) Int. Cl.
*H01S 3/22* (2006.01)
*H01S 3/03* (2006.01)
(Continued)

(52) U.S. Cl.
CPC . *H01S 3/03* (2013.01); *H01S 3/076* (2013.01); *H01S 3/0975* (2013.01)

(58) Field of Classification Search
CPC ......... H01S 3/03; H01S 3/076; H01S 3/2383; H01S 3/005; H01S 3/08059; H01S 3/2232; H01S 3/0071; H01S 3/0407; H01S 3/041; H01S 3/0835; H01S 3/0941; H01S 3/0975; H01S 3/23; H01S 3/031; H01S 3/0315; H01S 3/036
USPC .................................... 372/58, 34, 92, 93, 97
See application file for complete search history.

(56) References Cited

U.S. PATENT DOCUMENTS 3,705,999 A  12/1972  Hermann et al.
3,919,663 A  11/1975  Caruolo et al.
(Continued)

FOREIGN PATENT DOCUMENTS

DE  4029187 A1  3/1992
DE  4212390 A1  10/1993
(Continued)

OTHER PUBLICATIONS

International Application No. PCT/EP2012/003073, Preliminary Report on Patentability, Sep. 26, 2013, 14 pages.
(Continued)

*Primary Examiner* — Xinning Niu
*Assistant Examiner* — Vu A Vu
(74) *Attorney, Agent, or Firm* — Hoffman Warnick LLC

(57) ABSTRACT

The invention refers to a laser device comprising a tubular space formed by at least two resonator tubes (12) for a gas to be excited, excitation means (50) for each of the at least two resonator tubes for exciting the gas in the resonator tube for generating laser light, a partially reflecting output coupler (42) for coupling out a laser beam, and at least one gas reservoir container (60) which forms a gas reservoir, the gas reservoir container being free of excitation means and in fluidic communication with the tubular space, wherein the gas reservoir container is arranged between the at least two resonator tubes and connected to the tubular space at two separate connecting portions (20).

6 Claims, 3 Drawing Sheets

(51) Int. Cl.
*H01S 3/07* (2006.01)
*H01S 3/0975* (2006.01)

(56) References Cited

U.S. PATENT DOCUMENTS

| | | | |
|---|---|---|---|
| 4,131,782 A | 12/1978 | Einstein et al. | |
| 4,189,687 A | 2/1980 | Wieder et al. | |
| 4,376,496 A | 3/1983 | Sedam et al. | |
| 4,467,334 A | 8/1984 | Anzai | |
| 4,500,998 A | 2/1985 | Kuwabara et al. | |
| 4,652,722 A | 3/1987 | Stone et al. | |
| 4,720,618 A | 1/1988 | Stamer et al. | |
| 4,727,235 A | 2/1988 | Stamer et al. | |
| 4,744,090 A | 5/1988 | Freiberg | |
| 4,907,240 A | 3/1990 | Klingel | |
| 4,912,718 A * | 3/1990 | Klingel | 372/58 |
| 4,991,149 A | 2/1991 | Maccabee | |
| 5,012,259 A | 4/1991 | Hattori et al. | |
| 5,109,149 A | 4/1992 | Leung | |
| 5,115,446 A | 5/1992 | Von Borstel et al. | |
| 5,229,573 A | 7/1993 | Stone et al. | |
| 5,229,574 A | 7/1993 | Stone | |
| 5,268,921 A | 12/1993 | McLellan | |
| 5,337,325 A | 8/1994 | Hwang | |
| 5,339,737 A | 8/1994 | Lewis et al. | |
| 5,431,199 A | 7/1995 | Benjay et al. | |
| 5,572,538 A | 11/1996 | Saitoh et al. | |
| 5,592,504 A | 1/1997 | Cameron | |
| 5,646,907 A | 7/1997 | Maccabee | |
| 5,706,305 A | 1/1998 | Yamane et al. | |
| 5,729,568 A | 3/1998 | Opower et al. | |
| 5,815,523 A | 9/1998 | Morris | |
| 5,982,803 A | 11/1999 | Sukhman et al. | |
| 6,050,486 A | 4/2000 | French et al. | |
| 6,057,871 A | 5/2000 | Peterson | |
| 6,069,843 A | 5/2000 | DiMarzio et al. | |
| 6,122,562 A | 9/2000 | Kinney et al. | |
| 6,141,030 A | 10/2000 | Fujita et al. | |
| 6,229,940 B1 | 5/2001 | Rice et al. | |
| 6,263,007 B1 * | 7/2001 | Tang | 372/59 |
| 6,303,930 B1 | 10/2001 | Hagiwara | |
| 6,370,884 B1 | 4/2002 | Kelada | |
| 6,421,159 B1 | 7/2002 | Sutter et al. | |
| 6,539,045 B1 | 3/2003 | Von Borstel et al. | |
| 6,856,509 B2 | 2/2005 | Lin | |
| 7,346,427 B2 | 3/2008 | Hillam et al. | |
| 7,496,831 B2 | 2/2009 | Dutta et al. | |
| 7,521,651 B2 | 4/2009 | Gross et al. | |
| 2001/0030983 A1 | 10/2001 | Yuri et al. | |
| 2003/0010420 A1 * | 1/2003 | Morrow | 156/89.11 |
| 2003/0123040 A1 | 7/2003 | Almogy | |
| 2003/0147443 A1 | 8/2003 | Backus et al. | |
| 2005/0056626 A1 | 3/2005 | Gross et al. | |
| 2005/0094697 A1 | 5/2005 | Armier et al. | |
| 2006/0161381 A1 | 7/2006 | Jetter | |
| 2008/0094636 A1 * | 4/2008 | Jin et al. | 356/466 |
| 2009/0010285 A1 | 1/2009 | Dubois et al. | |
| 2009/0245318 A1 | 10/2009 | Clifford, Jr. | |
| 2009/0323753 A1 | 12/2009 | Gmeiner et al. | |
| 2011/0102537 A1 | 5/2011 | Griffin et al. | |
| 2014/0224778 A1 | 8/2014 | Armbruster et al. | |

FOREIGN PATENT DOCUMENTS

| | | |
|---|---|---|
| DE | 10125447 A1 | 1/2002 |
| EP | 0157546 A2 | 10/1985 |
| EP | 0427229 A3 | 5/1991 |
| EP | 1184946 A1 | 3/2002 |
| GB | 1495477 A | 12/1977 |
| GB | 2211019 A | 6/1989 |
| GB | 2249843 A | 5/1992 |
| GB | 2304641 A | 3/1997 |
| JP | 63094695 A | 4/1988 |
| JP | 5129678 A | 5/1993 |
| JP | 2001276986 A | 10/2001 |
| JP | 2007032869 A | 2/2007 |
| JP | 2007212118 A | 8/2007 |
| JP | 2011156574 A | 8/2011 |
| WO | 0046891 A1 | 8/2000 |
| WO | 0107865 A2 | 2/2001 |
| WO | 0243197 A2 | 5/2002 |

OTHER PUBLICATIONS

International Application No. PCT/EP2012/003072, Preliminary Report on Patentability, Mar. 12, 2014, 7 pages.
International Application No. PCT/EP2012/003071, Preliminary Report on Patentability, Mar. 12, 2014, 5 pages.
International Application No. PCT/EP2012/003070, Preliminary Report on Patentability, Mar. 12, 2014, 7 pages.
International Application No. PCT/EP2012/003069, Preliminary Report on Patentability, Nov. 27, 2013, 32 pages.
International Application No. PCT/EP2012/003068, Preliminary Report on Patentability, Mar. 12, 2014, 5 pages.
International Application No. PCT/EP2012/003067, Preliminary Report on Patentability, Nov. 28, 2013, 19 pages.
International Application No. PCT/EP2012/003066, Preliminary Report on Patentability, Nov. 28, 2013, 19 pages.
International Application No. PCT/EP2012/003065, Preliminary Report on Patentability, Nov. 28, 2013, 21 pages.
International Application No. PCT/EP2012/003064, Preliminary Report on Patentability, Nov. 15, 2013, 18 pages.
International Application No. PCT/EP2012/003063, Preliminary Report on Patentability, Mar. 12, 2014, 5 pages.
International Application No. PCT/EP2012/003062, Preliminary Report on Patentability, Mar. 12, 2014, 6 pages.
International Application No. PCT/EP2012/003061, Preliminary Report on Patentability, Mar. 12, 2014, 6 pages.
International Application No. PCT/EP2012/003073, Search Report and Written Opinion, Dec. 18, 2012, 8 pages.
International Application No. PCT/EP2012/003072, Search Report and Written Opinion, Oct. 8, 2012, 11 pages.
International Application No. PCT/EP2012/003071, Search Report and Written Opinion, Nov. 15, 2012, 9 pages.
International Application No. PCT/EP2012/003070, Search Report and Written Opinion, Oct. 8, 2012, 11 pages.
International Application No. PCT/EP2012/003069, Search Report and Written Opinion, Sep. 27, 2012, 8 pages.
International Application No. PCT/EP2012/003068, Search Report and Written Opinion, Nov. 15, 2012, 8 pages.
International Application No. PCT/EP2012/003067, Search Report and Written Opinion, Nov. 16, 2012, 7 pages.
International Application No. PCT/EP2012/003066, Search Report and Written Opinion, Nov. 15, 2012, 7 pages.
International Application No. PCT/EP2012/003065, Search Report and Written Opinion, Nov. 16, 2012, 7 pages.
International Application No. PCT/EP2012/003064, Search Report and Written Opinion, Nov. 16, 2012, 7 pages.
International Application No. PCT/EP2012/003063, Search Report and Written Opinion, Nov. 15, 2012, 9 pages.
International Application No. PCT/EP2012/003062, Search Report and Written Opinion, Nov. 15, 2012, 10 pages.
International Application No. PCT/EP2012/003061, Search Report and Written Opinion, Sep. 10, 2012, 9 pages.
U.S. Appl. No. 14/342,510, Office Action dated Aug. 1, 2014.
U.S. Appl. No. 14/342,508, Office Action dated Aug. 14, 2014.
U.S. Appl. No. 14/342,503, Office Action dated Aug. 21, 2014.
U.S. Appl. No. 14/342,487, Office Action dated Aug. 14, 2014.
U.S. Appl. No. 14/342,483, Office Action dated Oct. 2, 2014.
U.S. Appl. No. 14/342,493, Office Action dated Nov. 19, 2014.
U.S. Appl. No. 14/342,503, Final Office Action dated Dec. 18, 2014, 22 pages.

* cited by examiner

US 9,077,141 B2

GAS LASER DEVICE AND GAS RESERVOIR

FIELD OF THE INVENTION

The invention refers to a gas laser device.

RELATED ART

During the operation of a gas laser device, waste products will be generated which are not suitable for further excitation. For example, in a $CO_2$ laser gas components such as $H_2$, $H_2O$ and CO are formed during the operation of the laser. Therefore, the gas in the laser device either has to be regenerated in certain intervals or a constant flow of fresh gas has to be provided.

In order to enhance the time between two successive regenerations it is known to connect a gas container to the tubular space of the laser device in which gas excitation takes place. The gas container provides fresh gas to the tubular space.

WO 02/43197 discloses a gas laser comprising a discharge tube in which laser discharge occurs. A gas reservoir is in fluid communication with the interior of the discharge tube through two different passages.

U.S. Pat. No. 4,189,687 describes a gas laser having a laser tube and a reservoir being connected to the laser tube through different conduits at opposite ends of the laser tube. Gas from the reservoir migrates into the laser tube, maintaining gas capable of laser action in the laser tube.

U.S. Pat. No. 5,592,504 discloses a gas laser including a plurality of elongated cylindrical bores, wherein a first bore forms a laser gas discharge chamber and a second bore forms a laser gas reservoir chamber. The chambers are fluidly connected by an opening which is a narrow slot extending along the full length of the chambers.

U.S. Pat. No. 4,189,687 discloses a longitudinally excited gas laser comprising laser tubes and electrodes for generating a longitudinally excited gas laser discharge, the laser tube comprising a plurality of pipe sections mutually connected to each other. A gas reservoir is provided to replenish gas in the pipe sections.

U.S. Pat. No. 6,263,007 B1 discloses a laser assembly comprising a housing having an optical cavity containing a lasing medium, a pumping source coupled to stipulate the lasing medium to amplify laser light passing through the optical cavity and at least one lasing medium supply reservoir separate from the housing and storing a quantity of the lasing medium.

SUMMARY OF THE INVENTION

U.S. Pat. No. 5,115,446 discloses a carrying structure for the flanges and other elements of two laser beam paths. Above a top surface of a housing there is provided an upper partial star configuration of connecting lines, which has four inlet lines and four return lines. These have the form of rectangular tubes and accommodate coolers.

An object of this invention is to provide a compact laser device with a particularly good performance.

The object is solved according to the invention by a laser device.

The laser device according to the invention comprises a tubular space formed by at least two resonator tubes for a gas to be excited, excitation means for each of the at least two resonator tubes for exciting the gas in the resonator tubes for generating laser light, a partially reflecting output coupler for coupling out a laser beam, and at least one gas reservoir container which forms a gas reservoir, the gas reservoir container being free of excitation means and in fluidic communication with the tubular space. The gas reservoir container is arranged between the at least two resonator tubes and is connected to the tubular space at two separate connecting portions.

The inventive laser device is a gas laser. It may in particular be a $CO_2$ laser device, wherein the gas in the tubular space includes $CO_2$. In an embodiment of the invention the laser device is a laser device or marking head for marking or engraving an object with the laser beam.

An idea of the invention is to provide a gas reservoir or gas volume which extends the volume of gas in the tubular space which forms a resonator of the laser. This additional volume of gas is free of excitation means and is provided in addition to the tubular space of the laser device, that is, the resonator of the laser.

According to embodiments of the invention the tubular space contains a gas that is excited by excitation means provided at an outer circumference of the tubular space. Such excitation means may in particular be radio frequency electrodes. The tubular space may be at least partially surrounded by the excitation means for the excitation of the gas. The laser light is formed in the tubular space by the excitation of the gas. Because the gas reservoir container does not have any excitation means no laser light is formed in the gas container. Moreover, the laser light is in some cases reflected only outside the gas container.

The gas reservoir container comprises two separate connectors which are connected to two separate connecting portions of the tubular space. These separate connectors and connecting portions provide a good flow of gas from the gas reservoir container to the tubular space of the laser device. In particular the gas can be distributed to different sections of the tubular space in order to provide a more even distribution of fresh gas in the tubular space.

In an embodiment of the invention the tubular space and the gas reservoir container form a closed gas system. This means in particular that a cavity of the laser device formed by the tubular space and the gas reservoir container is a closed cavity and that there is no constant gas flow through the resonator. The gas in the cavity is only replaced in certain intervals when the laser device is out of operation. Fresh gas from the gas reservoir container is supplied to the tubular space, which forms the resonator, mainly by diffusion.

The tubular space includes a plurality of resonator tubes, in particular at least two resonator tubes, which may be linear resonator tubes interconnected by one or more flanges. The resonator tubes are arranged in an angled manner relative to each other and laser light may be reflected from one resonator tube to an adjacent resonator tube by a mirror arranged between the resonator tubes. The resonator tubes may be mechanically connected with each other. In other words the laser device can comprise a resonator including a plurality of interconnected resonator tubes.

The resonator tubes may have any form which is suitable for the generation of laser light and may be generally called laser gain volumes. It may be preferred according to the invention that the gain volumes be cylindrical or tubular in shape but other gain volume geometries could be used.

In an embodiment of the invention a connecting element is provided which is connected between two adjacent resonator tubes. The connecting element or corner flange may comprise at least one mirror for reflecting laser light between the resonator tubes and may include a ceramic material. In addition to such intermediate flanges between two resonator tubes, there may be end flanges connected to the resonator tubes at the opposite axial ends of the common tubular space.

The tubular space or resonator forms a cavity of the laser device in which laser light is reflected between a totally reflecting rear mirror at one end and a partially reflecting output coupler at the opposite end. The end flanges may contain the output coupler and the rear mirror, respectively.

In an embodiment of the invention the gas reservoir container is connected to at least one connecting element and/or an end flange. The connecting element can include inlet or connecting portions for at least two resonator tubes and the at least one gas reservoir container.

It may also be preferred that the connecting element comprises an inner cavity which is fluidly connected to at least two resonator tubes and which allows gas to flow between at least two adjacent resonator tubes and the at least one gas reservoir container. The inner cavity may have an angled tube-like shape, wherein in a corner of the cavity a mirror may be arranged for reflecting the laser light between the resonator tubes.

An advantageous mounting of the gas container may be achieved in that two connecting elements are provided, each connecting element being connected between two adjacent resonator tubes, and the gas reservoir container is connected to the two connecting elements. That is, the gas container may extend between two connecting elements. It may be advantageous that the gas container extends substantially along a resonator tube arranged between the two connecting elements.

Moreover it may be preferred according to the invention that the gas reservoir container is in fluidic communication with the at least two resonator tubes. Thus, fresh gas can be directly supplied to at least two resonator tubes, for example via one of the connecting elements. The gas reservoir container may have a tubular shape and is arranged in the same plane as the resonator tubes.

The at least two resonator tubes may for example be arranged in an L- or V-shape and the gas reservoir container may be arranged in the same plane between the resonator tubes. The gas reservoir container therefore connects two different resonator tubes of the laser device.

A compact laser device with increased power is achieved in that the resonator tubes are arranged in the shape of an open or closed ring surrounding a free central space between them. By folding the resonator around a free central space, the length of the resonator may be increased without increasing the overall length of the laser device, as compared to a linear resonator. The resonator tubes folded in a ring-shaped pattern provide a free space within the laser device which may at least partially be surrounded by the resonator tubes. The free space in the cross-section of the laser device may be used for example in that an object is placed in said free space. The object may for example be a scanning device having one or more movable mirrors, the gas excitation means or a resonator tube cooling means.

For providing the free space in a centre area of the laser device or marking head the resonator tubes can be arranged in the form of a circuit or ring which defines the free space. The resonator tubes may be straight tubes, that is, they have a longitudinal axis extending along a straight line. Corner areas may be formed between adjacent resonator tubes. Therefore, the form of such a resonator may also be described as an angled ring, which may either be a closed ring in the form of a loop or an open ring having a spacing between two of the resonator tubes.

It may be is preferred that the angle between each two adjacent resontor tubes is greater than 60". This allows for a better and in particular more effective coupling of the laser light between the resonator tubes. It may also be preferred according to the invention that the angles formed between each two adjacent resonator tubes are equal.

In a further embodiment of the invention the resonator tubes are arranged in a triangular, rectangular, square, U- or V-pattern. In a triangular pattern the resonator of the laser device includes three resonator tubes, whereas in the rectangular or square pattern the resonator may be made up of four resonator tubes. In other embodiments five or more resonator tubes may be provided and arranged in a polygonal form. The ring-like arrangement of the resonator tubes allows the geometry of the resonator to be optimized, for example to the power required and the volume limitation of the particular application. The U-pattern as an embodiment of an open ring or circuit provides easy access to the free central space via the opening in the ring. Therefore, an object may be inserted into the free central space through the clearance between two resonator tubes adjacent to the opening in the ring.

The laser device may be configured to direct the laser beam into the free central space surrounded by the resonator tubes and/or the at least one gas reservoir tube. To this end a deflecting mirror may be provided which deflects the laser beam passing through the output coupler in the direction of the free central space. This deflecting mirror or output mirror may be arranged outside the resonator, which is defined at opposite axial ends by the rear mirror and the output coupler.

In an embodiment of the invention the gas reservoir container is a gas reservoir tube having two separate tube connectors for a connection to the connecting portions of the tubular space. The gas reservoir tube is preferably arranged along at least a part of the triangular, rectangular, square or U-pattern of the resonator tubes. Moreover it may be preferred that the gas reservoir tube is arranged such that the free central space is kept for placing the scanning device, the gas excitation means, the resonator tube cooling means and/or other objects therein.

The resonator tubes and the gas reservoir tube may be arranged in one plane. The tubes in a common plane may provide a very compact and flat design of the laser device. Moreover, this embodiment allows a plurality of laser devices to be stacked, so that a laser arrangement having a plurality of stacked laser devices may be formed.

A compact laser device is formed in that the gas reservoir tube extends in parallel to at least one of the resonator tubes of the laser device. So, the gas reservoir container may have a tubular shape with a longitudinal axis which extends in a parallel manner to a longitudinal axis of the tubular space or one of the resonator tubes of the tubular space. The gas reservoir tube may have substantially the same length as the resonator tube and be arranged directly next to it, so that the cross-section of the laser device can be minimized.

In another embodiment of the invention the excitation means include at least one radio frequency electrode extending along a longitudinal axis of the tubular space, in particular along a longitudinal axis of the resonator tubes.

BRIEF DESCRIPTION OF THE DRAWINGS

The invention will now be further described with reference to the attached figures, wherein.

In all Figures, identical or corresponding components are identified by identical reference signs.

DETAILED DESCRIPTION OF THE INVENTION

Figure 1:
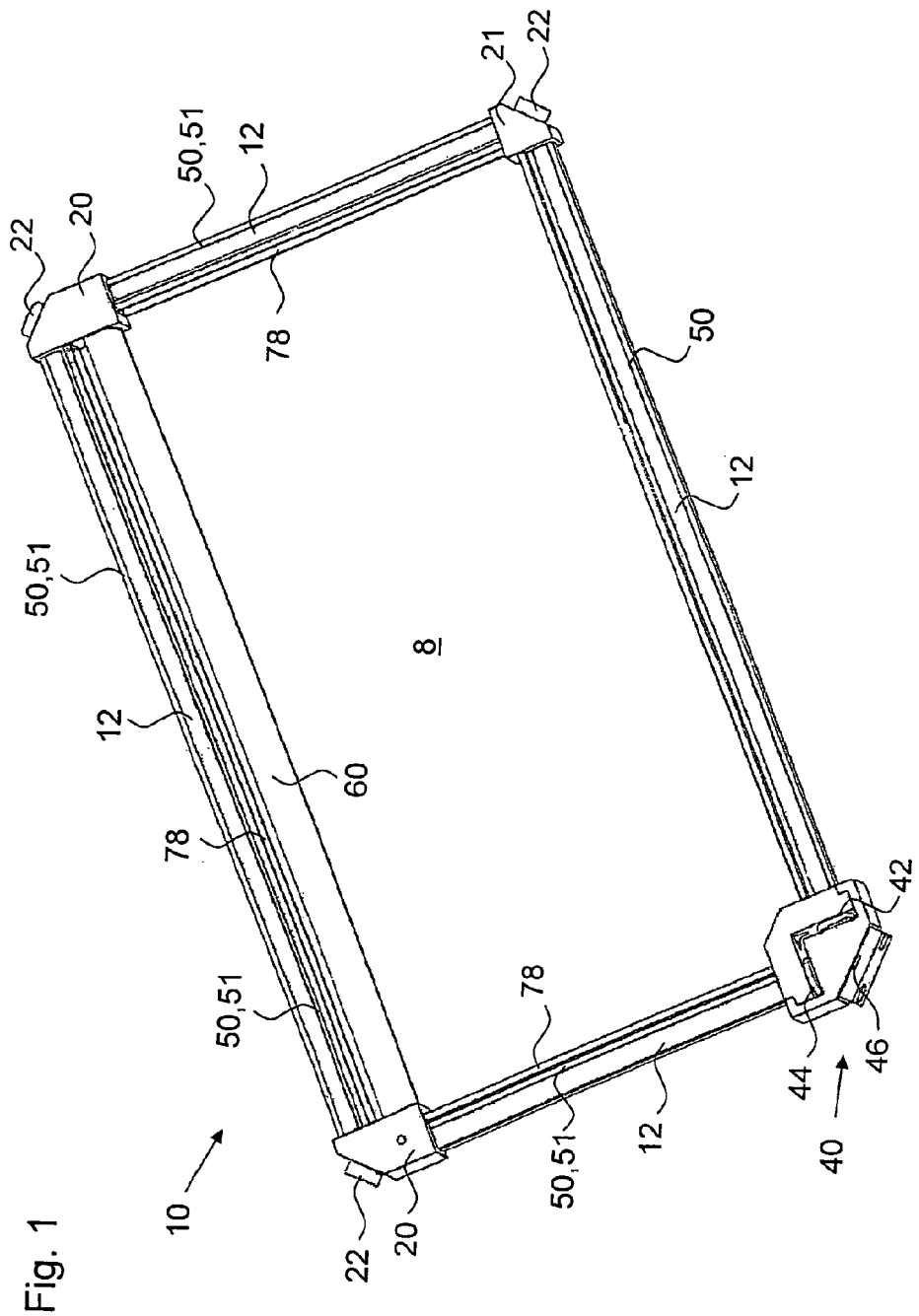
FIG. 1 shows a perspective view of a laser device according to the invention.
Figure 2:
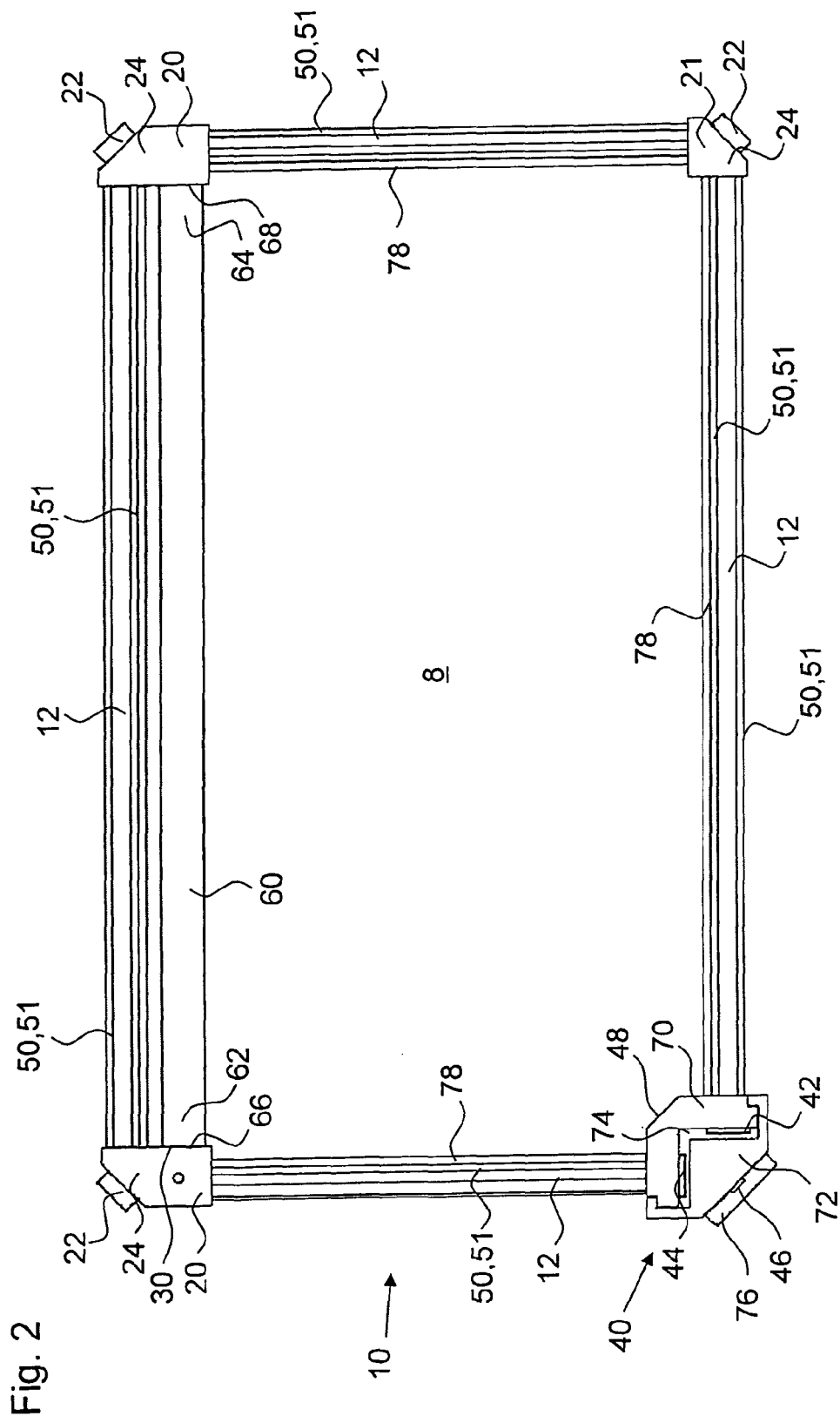
FIG. 2 shows a top view of a laser device according to FIG. 1.

FIGS. 1 and 2 show a laser device 10, according to the invention. The laser device 10 may in particular be a laser device for marking an object by means of a laser beam. One or more of such laser devices 10 may be integrated into a marking head for marking an object.

The laser device 10 comprises a plurality of resonator tubes 12 which may in particular be alumina tubes. The resonator tubes 12 form a part of a common tubular space which may be referred to as the resonator of the laser device 10. The resonator tubes 12 are at least partially enclosed by excitation means 50 in the form of radio frequency electrodes 51 for exciting a gas contained in the resonator tubes 12. The electrodes 51 extend substantially along the entire length of the resonator tubes 12 for exciting a gas contained therein.

In the shown embodiment the laser device 10 comprises four resonator tubes 12 arranged in a square. However, instead of a square resonator the resonator may also take the shape of a rectangle, a U-shape or a triangular shape. Instead of a resonator composed of four sides it could also be constructed with only two or three sides or more than four sides. The design allows the geometry of the resonator to be optimized to the power required and in the volume limitation of the application.

A central free space 8 is formed in an inner area of the laser device 10. The space 8 is surrounded by the resonator tubes 12. Each of the resonator tubes 12 has a longitudinal axis. The longitudinal axes of the resonator tubes 12 extend in one common plane.

In three of the four corners of the square connecting elements 20, 21 in the form of ceramic triangles are arranged for connecting adjacent resonator tubes 12. Each of the connecting elements 20, 21 has a mirror 22 for reflecting laser light from one resonator tube 12 to an adjacent resonator tube 12, thus coupling laser energy between the resonator tubes 12. The connecting elements 20, 21 each have a base body 24, to which the resonator tubes 12 are connected. The mirror 22 is attached to the base body 24.

At an axial end of one of the resonator tubes 12 a totally reflecting rear or end mirror 44 is arranged for reflecting the laser light in the resonator tube 12. At the end of second resonator tube 12 an output coupler 42 is arranged for coupling out a laser beam. The output coupler 42 is a partially reflecting mirror.

In the illustrated embodiment two of the resonator tubes 12, which may be called end resonator tubes, are interconnected by an integrated output flange 40. That is, the forth corner is constructed such that one face contains the rear mirror 44 and another face contains the partially reflecting output coupler 42.

The integrated output flange 40 comprises a first, inner base body 70 and a second, outer base body 72. An inner cavity or spacing 74 is formed between the first and second base bodies 60, 62 in which the rear mirror 44 and the output coupler 42 are received.

In a corner area of the integrated output flange 40 an output mirror 46 is provided for reflecting the laser beam coupled out through the output coupler 42 into a predetermined direction. The output mirror 46 is arranged such that the laser beam is reflected into the free central space 8 of the laser device 10. An output hole 48 is formed in the first base body 70 of the integrated output flange 40 through which the laser beam deflected by the output mirror 46 may pass into the free central space 8. A mounting flange 76 is connected to the second base body 72.

Along one resonator tube 12 a second tube is arranged which is free of excitation means 50 and forms a gas reservoir container 60 of the laser device 10. The gas reservoir container 60 supplies gas ballast to the resonator tubes 12 for an increased lifetime of the laser device 10. The gas reservoir tube or container 60 may have different dimensions, in particular a larger diameter, than the resonator tubes 12. Generally, the gas ballast structure could take any shape or even be a separate volume connected to the laser device 10 via tubes.

The gas reservoir tube or container 60 is connected at a first axial 62 end to a first connecting element 20 and at a second axial end 64 to a second connecting element 20. A first tube connector 66 is provided at the first axial end 62 and a second tube connector 68 is provided at the second axial end 64. The first connecting element 20 includes a first connecting portion 30 for connecting the first tube connector 66 of the gas reservoir tube and the second connecting element 20 includes a second connecting portion 32 for connecting the second tube connector 68.

The gas reservoir tube is arranged in a parallel manner to the resonator tube 12 connected to the same connecting elements 20.

Figure 3:
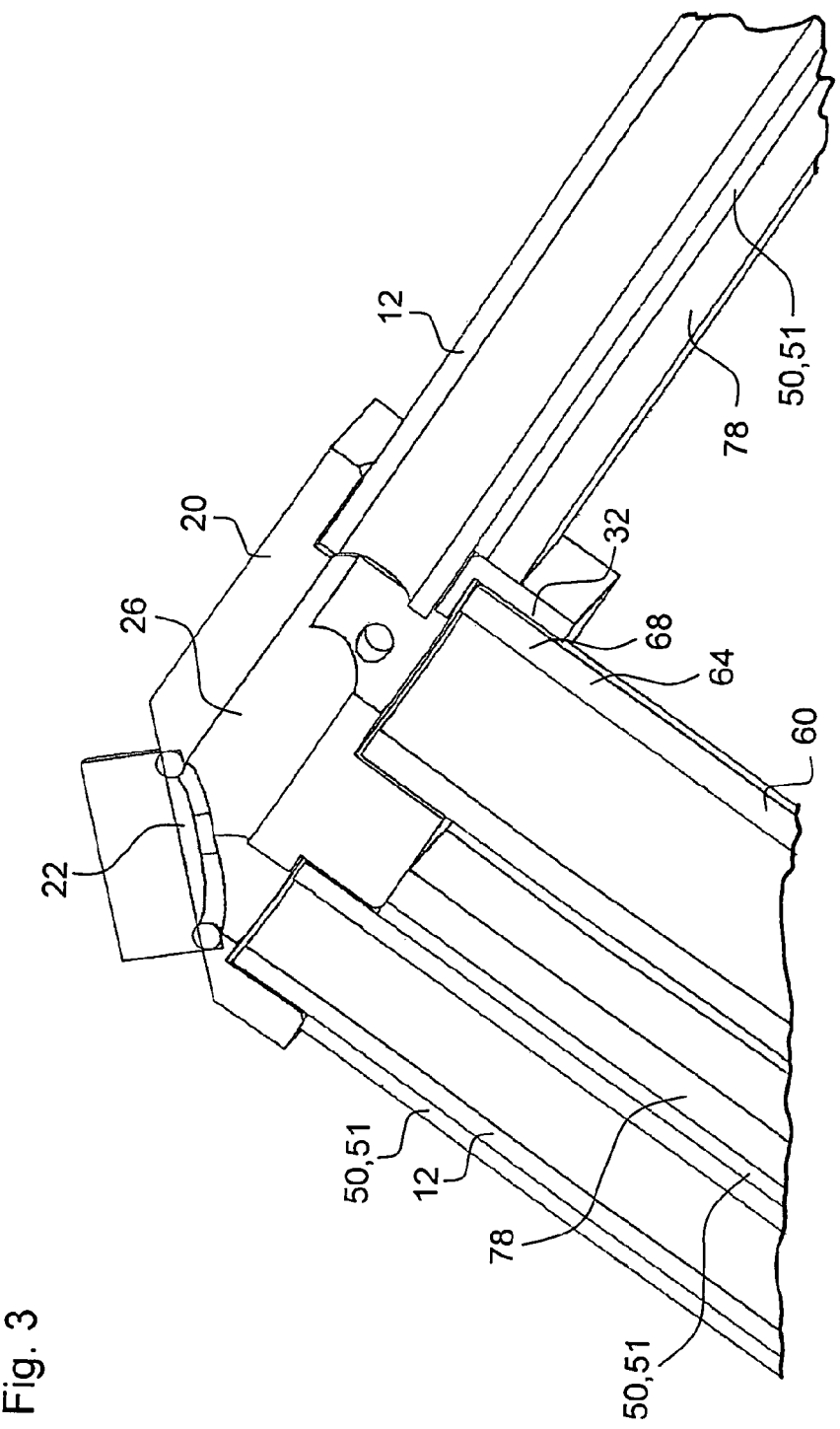
FIG. 3 shows an enlarged view of a corner portion of the laser device according to FIGS. 1 and 2.

FIG. 3 shows a detailed view of a corner between two resonator tubes 12. The resonator tubes 12 are connected to a connecting element 20 which may also be referred to as a connecting flange or corner flange. The connecting element 20 has three inlet portions, two for connecting the resonator tubes 12 and one for connecting the gas reservoir tube or container 60. An inner cavity 26 is formed within the connecting element 20, providing a fluidic connection between the resonator tubes 12 and the gas reservoir container 60.

The inlet portion for connecting the gas reservoir container 60 and the inlet portion for one of the resonator tubes 12 are arranged on one side of the connecting element 20 next to each other in a parallel manner. The inlet portion for the other resonator tube 12 is arranged on a second side of the connecting element 20. In a corner area a mirror 22 is arranged for reflecting laser light between the resonator tubes 12. The mirror 22 is arranged such that basically no laser light enters the gas reservoir container 60.

Cooling blocks 78 are arranged next to the resonator tubes 12 for cooling the gas contained in the resonator tubes 12.

The invention claimed is:
1. A laser device comprising:
a tubular space formed by at least three resonator tubes for a gas to be excited;
excitation means for each of the at least three resonator tubes for exciting the gas in the resonator tube for generating laser light;
a partially reflecting output coupler for coupling out a laser beam; and
at least two connecting elements, each connecting element being connected between two adjacent resonator tubes,
wherein the resonator tubes are arranged in one plane and in the shape of an open or closed ring surrounding a central space between them,
wherein:
at least one gas reservoir tube is connected to the tubular space at two separate connecting portions formed at two of the connecting elements, the gas reservoir tube being free of excitation means and in fluidic communication with the tubular space and forming a gas reservoir, and the gas reservoir tube is arranged in the plane of the resonator tubes, in the space between the resonator tubes and along one of the resonator tubes, wherein the resonator tubes and the gas reservoir tube form a closed cavity.

2. The laser device according to claim 1, wherein the at least two connecting elements each comprise an inner cavity which is in fluidic communication with the two adjacent resonator tubes and the at least one gas reservoir tube.

3. The laser device according to claim 1, wherein the gas reservoir tube extends in parallel to at least one of the resonator tubes.

4. The laser device according to claim 1, wherein the excitation means include at least one radio frequency electrode extending along a longitudinal axis of the tubular space.

5. The laser device of claim 1, wherein the connecting elements each comprise at least one mirror for reflecting laser light between the resonator tubes.

6. The laser device of claim 1, wherein the gas reservoir tube has two separate tube connectors for a connection to the connecting portions of the tubular space.

\* \* \* \* \*